Feb. 8, 1966 L. L. MYERS 3,233,700

AERIAL TOWER MECHANISM

Filed July 11, 1963 8 Sheets-Sheet 1

INVENTOR.
Lester L. Myers,
BY Hood, Gust & Irish
Attorneys.

INVENTOR.
Lester L. Myers,
BY Hood, Gust & Irish
Attorneys.

AERIAL TOWER MECHANISM

Filed July 11, 1963 8 Sheets-Sheet 3

INVENTOR.
Lester L. Myers,
BY Hood, Gust & Irish
Attorneys.

INVENTOR.
Lester L. Myers,
BY Wood, Gust & Irish
Attorneys.

INVENTOR.
Lester L. Myers,
BY Hood, Gust & Irish
Attorneys.

AERIAL TOWER MECHANISM

Filed July 11, 1963 8 Sheets-Sheet 6

INVENTOR.
Lester L. Myers,
BY Hood, Gust & Irish
Attorneys.

INVENTOR.
Lester L. Myers,
BY Hood, Gust & Irish
Attorneys.

AERIAL TOWER MECHANISM

Filed July 11, 1963 8 Sheets-Sheet 8

INVENTOR.
Lester L. Myers,
BY Wood, Gust & Irish
Attorneys.

United States Patent Office 3,233,700
Patented Feb. 8, 1966

3,233,700

AERIAL TOWER MECHANISM

Lester L. Myers, Fort Wayne, Ind., assignor to Mobile Aerial Towers, Inc., Fort Wayne, Ind., a corporation of Indiana Filed July 11, 1963, Ser. No. 294,406
27 Claims. (Cl. 182—2)

The present invention relates to an aerial tower mechanism and more particularly to an arrangement for maintaining a personnel-carrying platform in level position regardless of the elevated, angular position of the tower booms which support the platform.

Mobile aerial towers of the so-called "cherry picker" type conventionally comprise a mobile unit or truck upon which a tower structure is mounted for three-dimensional operation. The tower structure conventionally includes a turntable having an elongated lower boom pivotally mounted thereon. This pivotal mounting provides for swinging movement of the lower boom about a horizontal axis while the turntable provides for swinging movement about a vertical axis. To the outer end of the lower boom is pivotally connected an upper boom for swinging movement about another horizontal axis. To the remaining, outer end of the upper boom is pivotally connected a personnel platform or bucket which is at all times maintained in level position regardless of the position and elevation to which the two booms may be moved. Suitable motors provide rotary motion as well as relative vertical movement of the booms, such booms being swingable to a lower position in which the personnel bucket is positioned adjacent to the truck and to an elevated position of the desired height above the truck within the limits of the boom dimensions.

Such towers are conventionally used in the construction or maintenance of electrical power lines, and it is quite common for workmen to operate on the power lines while the latter are carrying relatively high voltages. For this purpose, it is essential in the first instance that the personnel bucket be adequately strong to support the weight of a workman as well as the equipment which he must use while in the elevated position. Also, the bucket should be of high dielectric strength in order to protect the man from danger in the event he should come into contact with a charged power line. Still further, it is necessary for the two booms to be strong enough to support adequately the load carried by the bucket and furthermore to be nonconductive in order to insulate a workman in the bucket from the ground in the event the workman comes into contact with or close proximity to a power line.

It is now conventional to fabricate such booms from polyester resin and Fiberglas such that a total tower length of approximately fifty feet will yield a dielectric strength capable of insulating against one million volts.

During the operation of the tower, it is essential that the bucket or personnel platform be maintained level at all times, and this is conventionally accomplished through the use of metallic cables, rods and the like which are operatively secured at one end to the bucket and at the other end to various parts of the tower located at the lower ends of the booms. While various means have been provided in the past for breaking the conductive paths provided by these cables, rods and the like, still this has had the net effect of lowering the total insulating value of the tower booms as well as requiring certain structural features in the booms which, after a period of operation, collect enough moisture and dirt as to seriously impair the insulating value of the booms. In one conventional tower arrangement, the aforesaid leveling cables and rods are passed through the interior of the booms. These booms are open at the ends thereof such that rain, moisture and the like tend to wet the interior walls and to be retained thereby, and it is quite obvious that when this occurs, the booms acquire a value of conduction which indeed lowers the insulation value thereof to a dangerous level. Also, after a period of time, dust and dirt combining with the water permanently collects and adheres to the interior surfaces of the booms, thereby substantially reducing the insulating properties of the booms even though the interior thereof may be dry.

The requirements of relatively great dielectric strength of the booms coupled with maintaining the personnel bucket level have heretofore been regarded as somewhat inconsistent inasmuch as it has been necessary to use certain leveling structure of a conductive nature which detracts from the insulating qualities of the booms. In the present invention, a unique arrangement is provided whereby the maximum insulating qualities of the booms are not impaired by bucket-leveling mechanism such that maintenance of adequate insulation between the workmen in the bucket and the earth can more readily be maintained.

It is therefore an object of this invention to provide an aerial tower mechanism equipped with a bucket-leveling arrangement whereby a workman in the bucket will be adequately insulated from the earth in working on high power lines.

It is another object of this invention to provide in an aerial tower mechanism a sealed boom arrangement incorporating bucket-leveling mechanism in a manner which inhibits the collection of moisture and dirt inside the boom.

It is still another object of this invention to provide a bucket-leveling mechanism for an aerial tower wherein power is utilized in a controlled manner to maintain the bucket level at all times regardless of the elevated positions of the booms.

It is yet another object of this invention to provide a bucket-leveling mechanism for an aerial tower wherein a servo control arrangement which responds to the movement of the booms serves in positively maintaining the bucket level.

It is still another object of this invention to provide a bucket-leveling mechanism for an aerial tower wherein hydraulic power is used for maintaining the bucket level at all times, irrespective of the pivoted positions of the booms, this power being applied in a manner directly responsive to the movement of the booms through the intermediary of a servo control valve.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
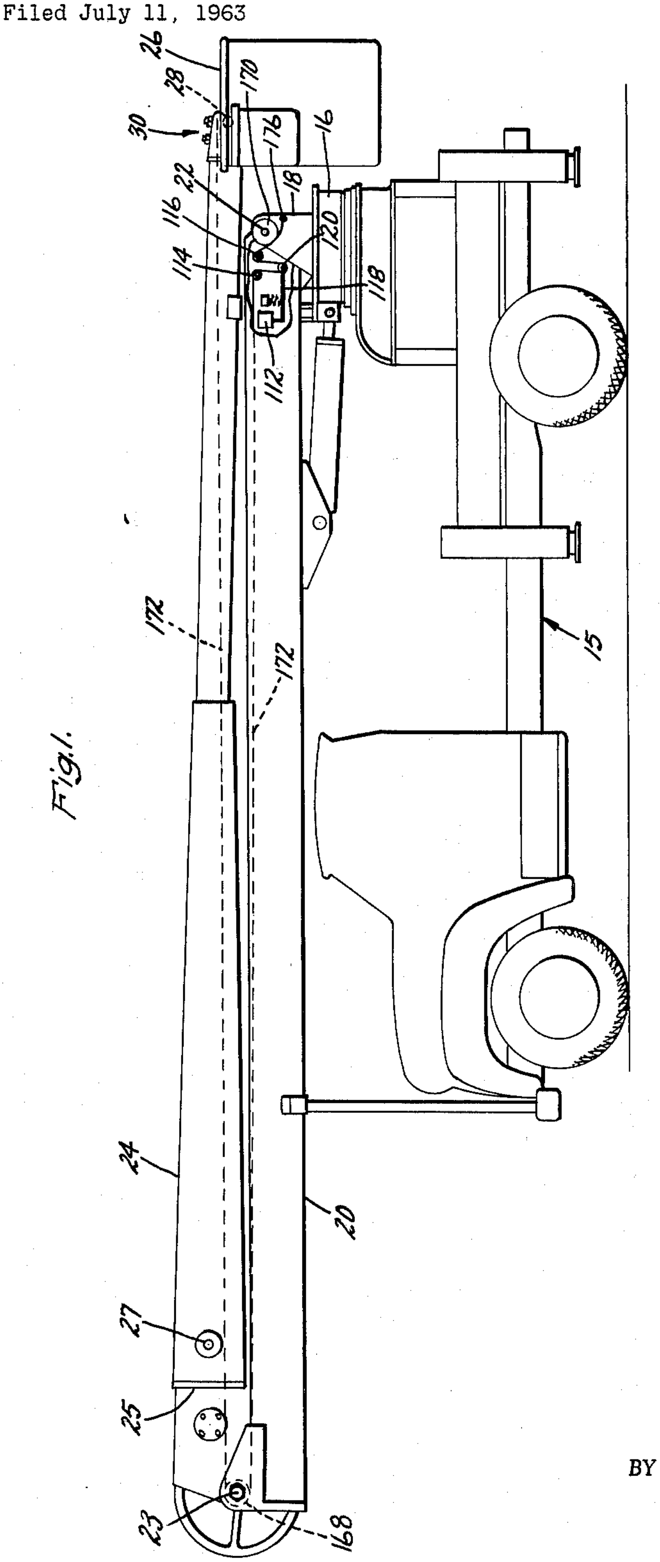
FIG. 1 is a side elevation of one aerial tower embodiment of this invention.
Figure 2:
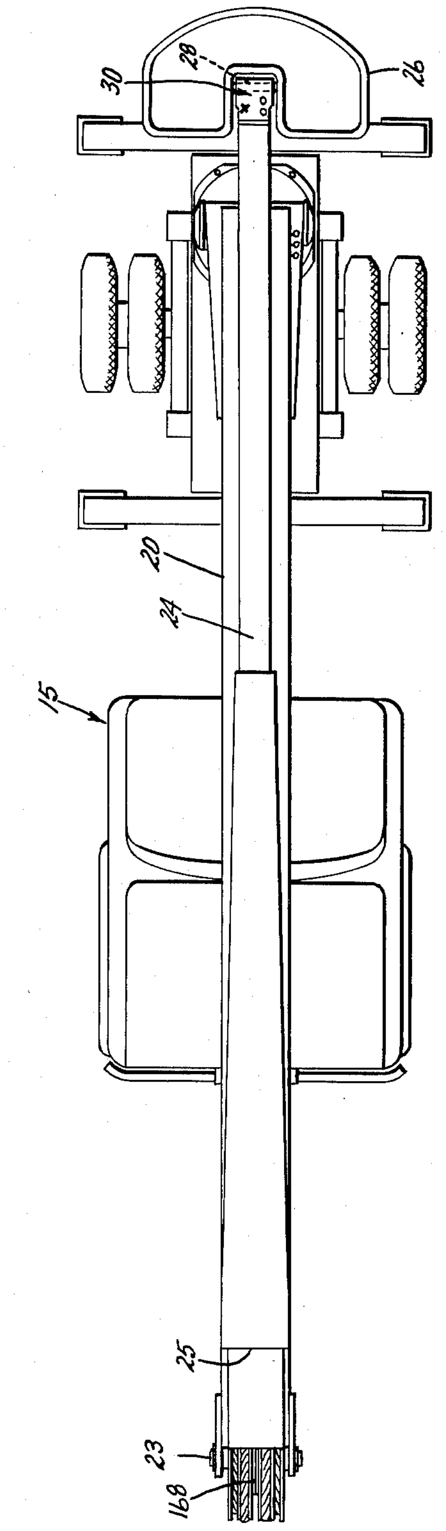
FIG. 2 is a top plan view thereof.

Referring to the drawings, and more particularly to FIGS. 1 and 2, a truck 15 has mounted on the rear thereof a conventional turntable 16 having an upstanding support or frame 18 thereon. A lower boom 20 is pivotally connected to the support 18 by means of a horizontal shaft 22. Pivotally connected to the left-hand end of the lower boom 20 is an upper boom 24, this pivotal connection being provided by another horizontal shaft 26. Conventionally, the shafts 22 and 23 are parallel. On the outer end of the upper boom 24 is pivotally mounted a personnel platform or bucket 26, this pivotal connection being provided by a shaft 28. As in the case of the two shafts 22 and 23, this shaft 28 is parallel thereto.

When the tower is completely collapsed as shown in both FIGS. 1 and 2, the booms 20 and 24 are positioned adjacent to the truck and extend substantially horizontally. The bucket 26 is positioned adjacent the truck bed such that personnel can easily enter and depart therefrom.

Suitable power mechanism is employed in the arrangement shown in FIGS. 1 and 2 for elevating the bucket 26 to any desired position by pivoting either or both of the booms 20, 24 upwardly from the positions illustrated. Such mechanism is conventional and does not need to be further elaborated herein.

At this point it is well to state that the bucket 26 is so constructed as to be level when freely suspended on the shaft 28, such that if personnel were centered in the bucket 26 and no mechanism were employed to position positively the bucket with respect to the upper boom, the bucket would hang like a pendulum and maintain its level position. This level position is obtained by suspending the bucket near the top edge as shown along a vertical line which passes through the center of gravity.

The booms 20 and 24 are fabricated of polyester resin reinforced with glass cloth and fiber and may be of tubular or rectangular cross-section. In any event, the booms are hollow such that operating cables and hydraulic lines may be passed therethrough.

The upper end of the upper boom 24 is provided with a tip assembly which is indicated generally by the reference numeral 30 and illustrated in details in FIGS. 3 through 7. This tip assembly comprises a strong, metallic casting 32 of iron or aluminum and is shaped in the form of sealed enclosure which is telescopically fitted into the upper end of the boom 24 in the region indicated by the numeral 34. For hermetically sealing this upper end of the boom 24, a rubber O-ring seal may be interposed between the end of the boom 24 and the casting 32 as shown.

Figures 3, 4:
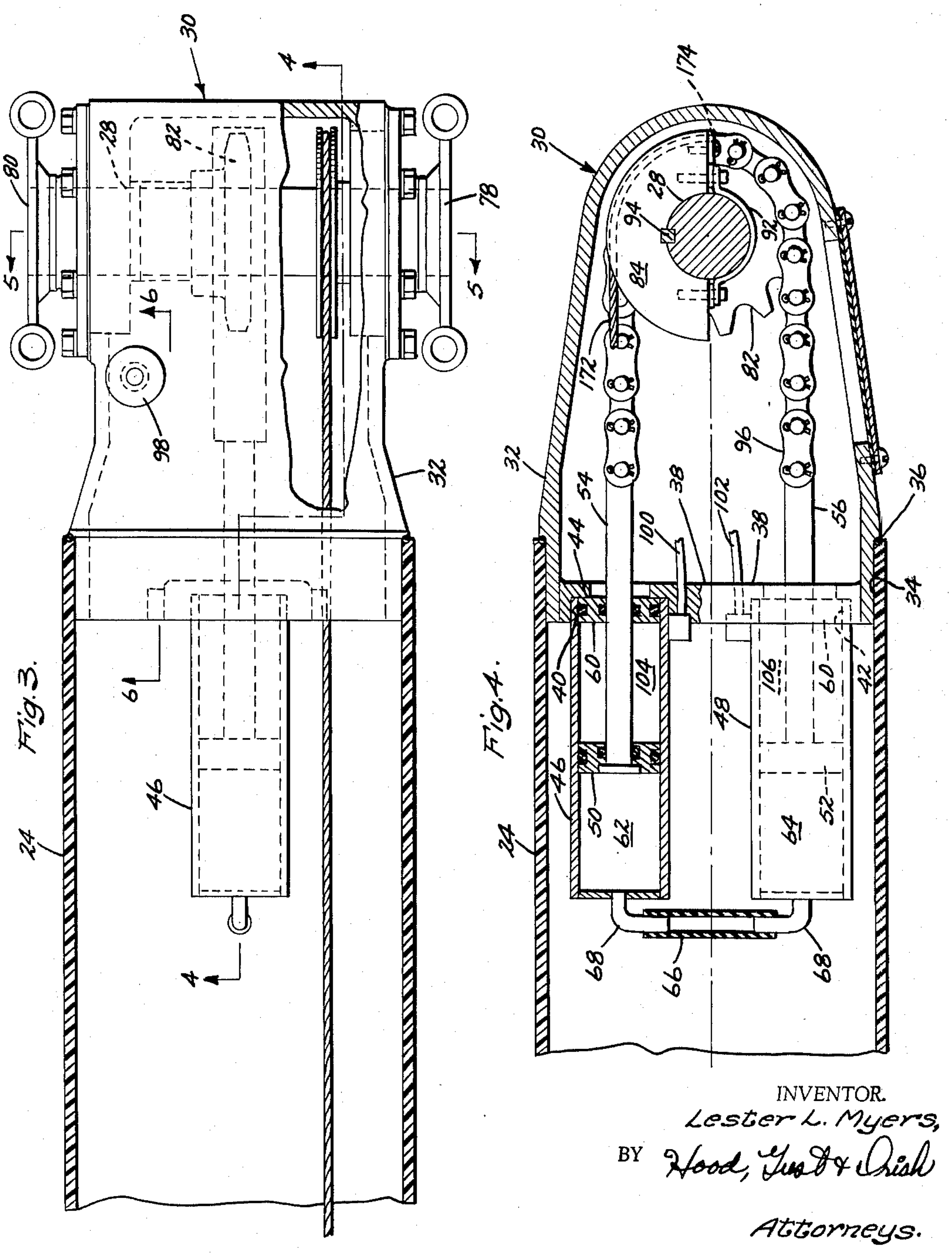
FIG. 3 is a fragmentary top plan view, partially broken away and sectioned for clarity, of the mechanism mounted on the upper end of the upper boom.
FIG. 4 is a sectional view taken substantially along section line 4—4 of FIG. 3.
Figure 5:
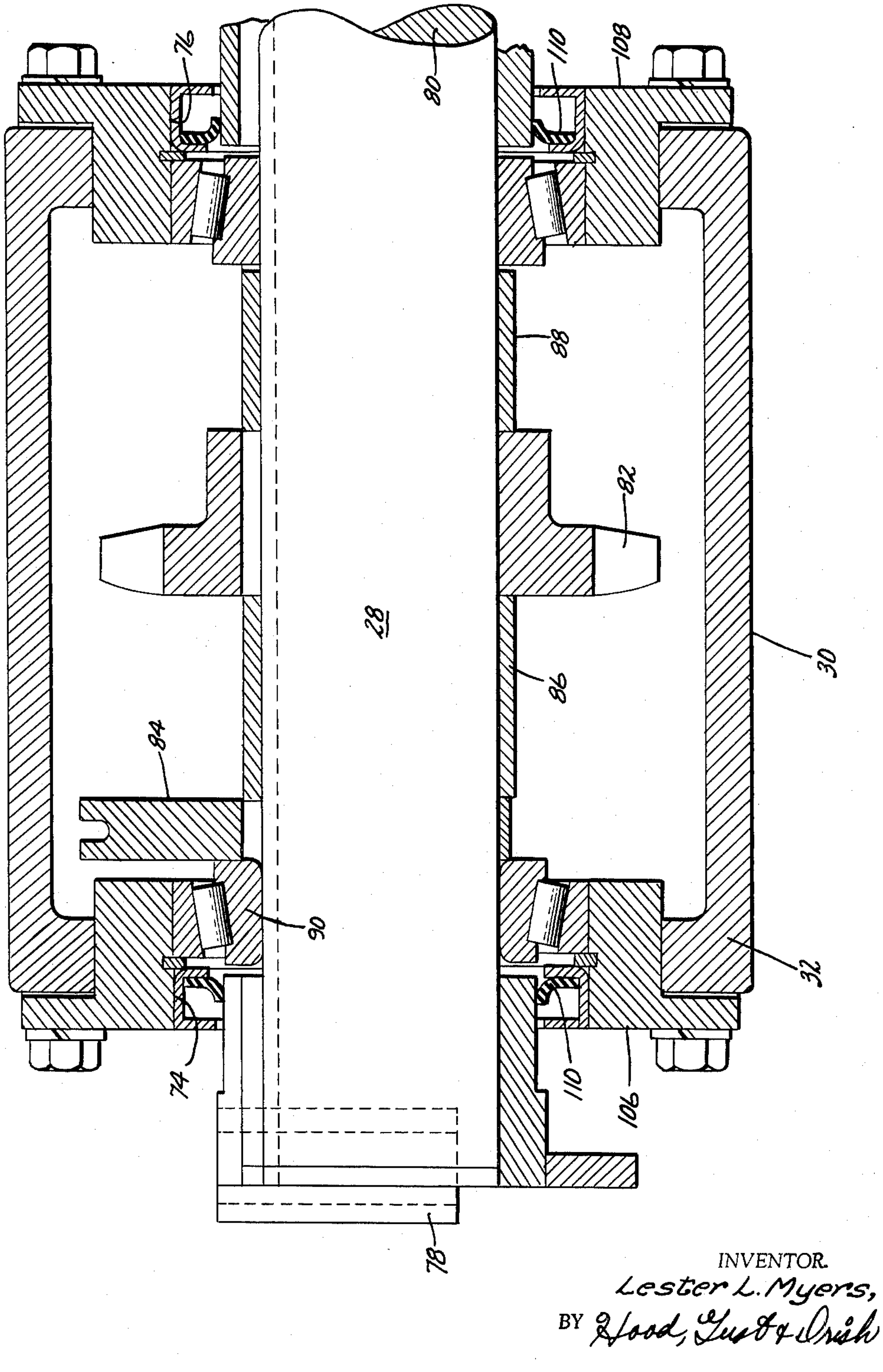
FIG. 5 is a sectional view taken substantially along section line 5—5 of FIG. 3.
Figures 6, 7:
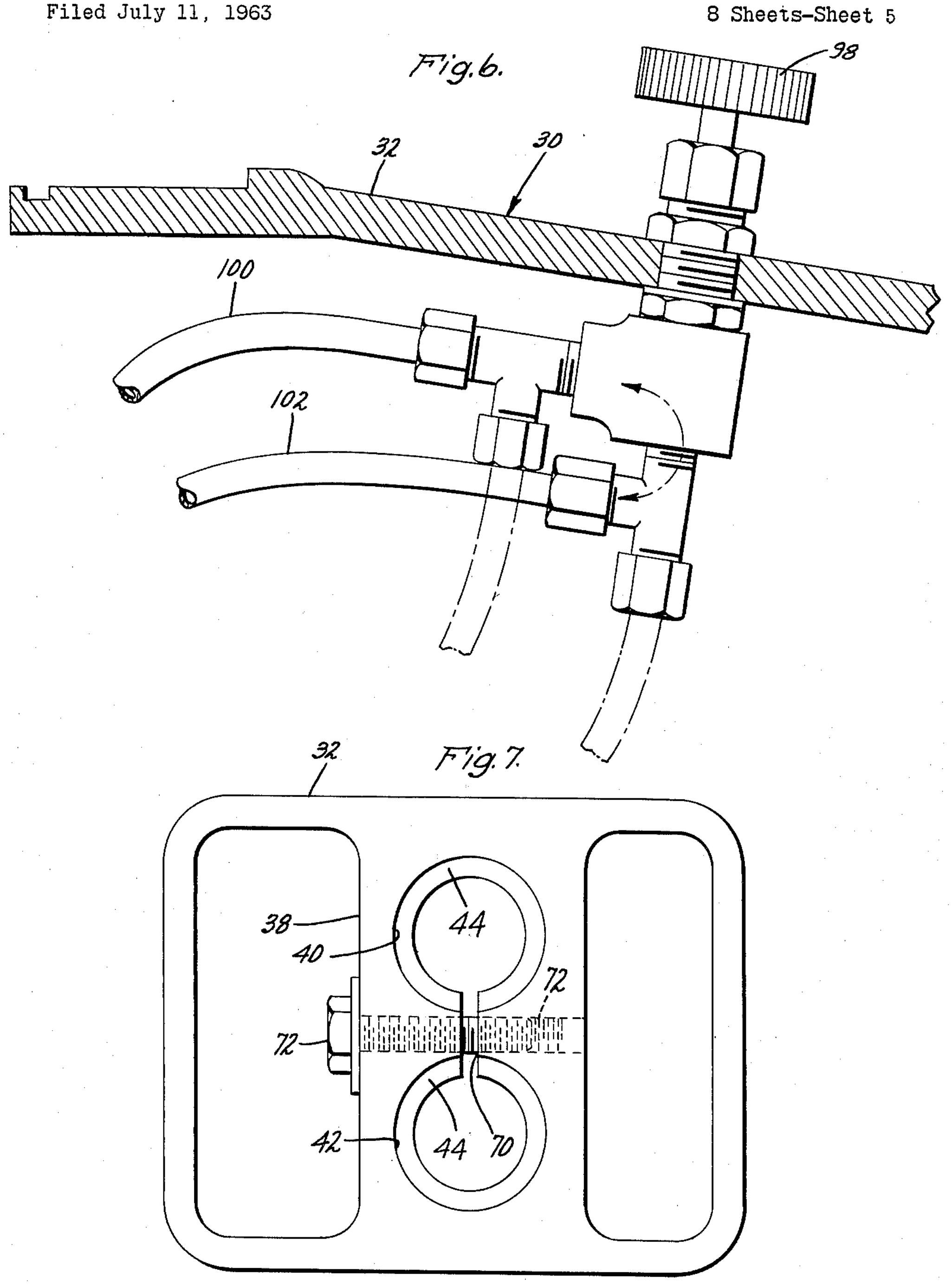
FIG. 6 is a fragmentary sectional view taken substantially along section line 6—6 of FIG. 3.
FIG. 7 is an end view of the housing shown in the preceding FIGS. 3, 4 and 5.

The casting 32 is variously shown in FIGS. 3–7 and is formed at the left-hand end thereof as viewed in FIGS. 3 and 4 with an integral transverse rib 38 which is more clearly shown in FIG. 7. This rib 38 is provided with two vertically spaced, cylindrical openings 40 and 42 having radial shoulders 44. Two hydraulic power cylinders 46 and 48 have the right-hand ends thereof as shown in FIG. 4 frictionally fitted into the respective openings 40 and 42 in coaxial alignment therewith. These cylinders reciprocably receive pistons 50 and 52 having piston rods 54 and 56, respectively, which coaxially pass through the openings 40 and 42 and otherwise are parallel to each other. Further than this, the piston rods 54 and 56 are positioned parallel to the longitudinal axis 58 of the upper boom 24. The right-hand ends of the two cylinders 46 and 48, respectively, are sealed by closure members 60 which coaxially receive the piston rods 54 and 56 therethrough. The pistons 50, 52 and the end closures 60 provided fluid-tight compartments 104, 106 therebetween. The two compartments 62 and 64 on the left-hand sides of the two pistons 50 and 52 are connected together by means of a rubber sleeve 66 telescoped over two suitable fluid fittings 68 which are connected to the ends of the compartments 62, 64 as shown. It may be stated at this point that the rubber sleeve 66 is sufficiently elastic as to permit the escape of air or fluid in the event pressure in one or both of the compartments 62, 64 builds much above atmospheric.

With reference to FIG. 7, it will be noted that the rib 38 is slotted at 70 between the two openings 40 and 42 and that a bolt 72 is transversely passed through this slot 70 and threaded to the right-hand portion 72 of the rib 38. By drawing this bolt 72 down, the walls of the openings 40 and 42 are securely clamped around the right-hand ends of the hydraulic cylinders 46, 48 (FIG. 4).

The shaft 28 previously described is journaled in suitable bearings assembled in openings 74 and 76, respectively, in the opposite lateral sides of the housing 32, as shown in FIG. 5. The axis of this shaft 28 is arranged to be horizontal and normal to the plane of the axes of the two piston rods 54 and 56, respectively. The opposite ends 78 and 80 of the shaft 28 project beyond the opposite lateral sides of the housing 32 and have fixedly secured thereto the personnel bucket 26 shown in FIGS. 1 and 2.

Centrally secured to the shaft 28 is a sprocket 82, and to the left of this sprocket 82 as shown in FIG. 5 is a pulley device or segment 84 which is also secured to the shaft 28. Suitable sleeves 86 and 88 serve as spacers for centering the sprocket 82 and for positioning the pulley segment 84 against the bearing assembly 90. The sprocket 82 and pulley segment 84 are thereby secured in fixed axial relationship for rotation with the shaft 28. As shown more clearly in FIG. 4, a semi-circular clamp 92 is used to secure the pulley segment 84 to the shaft 28, and a key positively locks the segment 84 against relative rotation with respect to the shaft 28.

A chain 96 is engaged with the sprocket 82 and is connected at its opposite ends to the two piston rods 54 and 56 as shown. It will now be observed that leftward movement of the piston 50 (FIG. 4) will result in counterclockwise rotation of the sprocket 82 and shaft 28 and that leftward movement of the piston 52 will result in clockwise rotation thereof.

Mounted on the upper side of the housing 32 as shown more clearly in FIGS. 3 and 6 is a hand valve 98 having two lines 100 and 102 which extend into communication with the two compartments 104 and 106, respectively, of the power cylinders 46 and 48. This hand valve 98 is conventional and is so constructed that when it is operated to closed position, communication between the two lines 100 and 102 through the valve body is severed, but that when it is opened the two lines are placed into full communication with each other. This will be explained more fully in the description to follow.

As shown more clearly in FIG. 5, the openings 74 and 76 in the sides 106 and 108 of the housing 32 are hermetically sealed by means of conventional sealing assemblies 110. It is important that the housing 32 after being assembled to the boom 24 be hermetically sealed, and in order to accomplish this, suitable seals and gaskets are used around the various protruding parts and access openings.

Fixedly mounted on the lower boom 20 adjacent to the pivot 22 is a servo valve mechanism which includes an operating valve 112 and two idler pulleys 114 and 116.

respectively. The two idler pulleys 114 and 116 are longitudinally spaced apart with respect to the boom 20 and are mounted on suitable horizontal shafts secured at one end to the boom wall. The valve 112 is also fixedly secured in a suitable manner to the boom wall and is provided with an operating arm 118 having a pulley 120 on the outer end thereof which normally is positioned below and on a vertical line passing between the two pulleys 114, 116. The reason for this will become apparent from the description which is given later on.

Figures 8, 9:
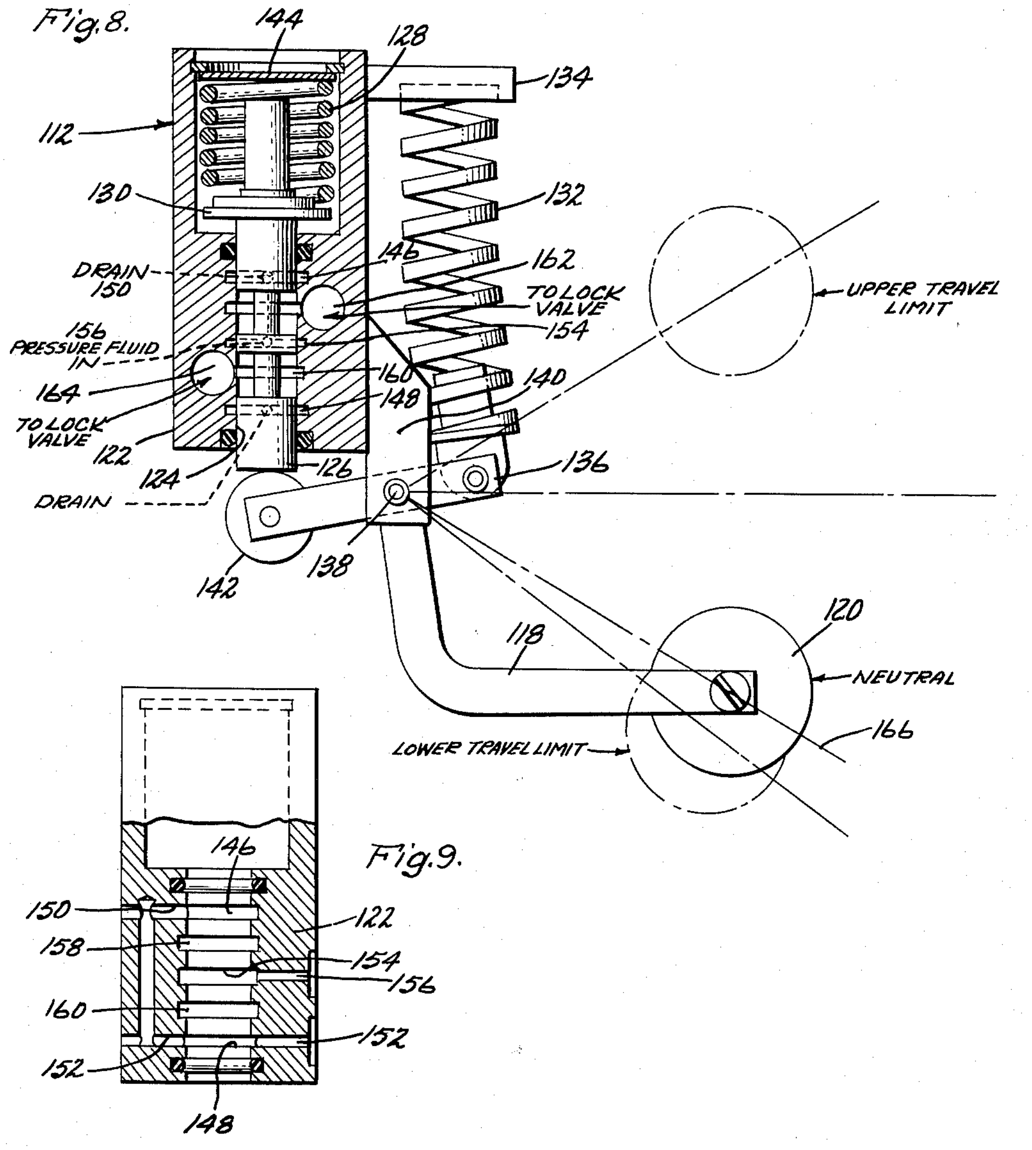
FIG. 8 is a longitudinal sectional view of the servo valve mechanism employed in the arrangement shown in FIGS. 1 and 2.
FIG. 9 is a longitudinal sectional view of the valve body of FIG. 8.
Figure 10:
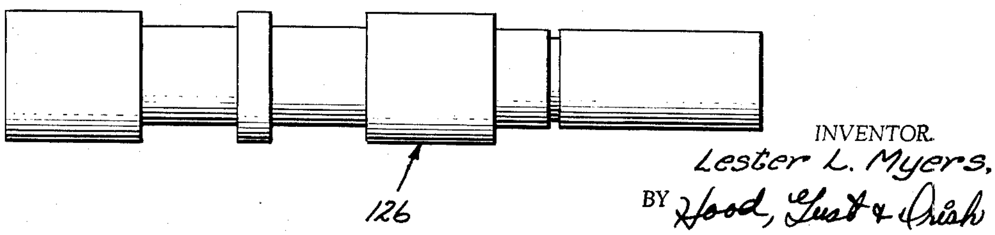
FIG. 10 is a view of the valve spool employed in the mechanism of FIG. 8.

The valve 112 which in many respects is conventional is shown in detail in FIGS. 8, 9 and 10 and will now be described. This valve, which hereinafter is referred to as a servo valve, comprises a valve body 122 having a transversely ported bore 124 which reciprocably receives a cylindrical valve spool 126. The body 122 is shown in detail in FIG. 9 while the spool 126 is shown in detail in FIG. 10. A helical compression spring 128 bears against the upper end of the body 122 and at the lower end against a suitable washer assembly 130 on the spool 126, this spring 128 yieldably urging the spool 126 downwardly as shown in FIG. 8. Another helical compression spring 132 is contained between a fixed support 134 extending from the valve body 122 and lever end 136 on the operating lever 118, this operating lever 118 being pivotally connected at 138 to the bracket 140 secured to the valve body 122. This lever 118 is provided on its left-hand end (FIG. 8) with a suitable roller 142 which engages the lower end of the valve spool 126 as shown. The leverages and spring strengths are so arranged that without any forces being applied to the pulley 120, the spring 132 will overcome the spring 128 in forcing the valve spool 126 to its uppermost position into engagement with the end plate 144 mounted in the valve body 122.

The bore 124 is provided with two axially spaced, concentric valve grooves 146 and 148, respectively, which in turn are connected to two drain passages 150 and 152, respectively. Midway between the two drain grooves 146 and 148 is another concentric groove 154 which has a pressure fluid passage 156 connected thereto. Then, straddling the groove 154 and between the drain grooves 146 and 148 are two discharge grooves 158 and 160, respectively, to which are connected two line passages 162 and 164, respectively.

In the hydraulic system, hydraulic fluid under pressure is connected to the port 156 and a tank or suitable reservoir at atmospheric pressure is connected to the two passages 150 and 152. With the operating arm 118 centrally positioned as shown along a line 166 which passes through the center of the pulley 120 and pivot 138, communication between the passage 156 and all the other passages 150, 152, 162 and 164 is cut off. With the lever 118 swung counterclockwise from this position, the valve spool 126 is depressed such that communication may be established between passage 156 and passage 162, passage 164 simultaneously being brought into communication with drain passage 152. Conversely, swinging arm 118 clockwise from the aforementioned neutral position results in raising the spool 126 whereby pressure port 156 is brought into communication with passage 164 and passage 162 in turn is communicated with drain passage 150. Thus it will be apparent that with the lever 118 positioned centrally or in neutral along the line 166, the valve spool 126 severs communication between all passages. However, upon moving the valve spool 126 either upwardly or downwardly, first one passage 162 is brought into communication with pressure passage 156 and in the other direction passage 164 is brought into communication with the same pressure passage 156. While a particular valve mechanism has been described in connection with performing this function, as will appear to persons skilled in the art, other specific valve mechanisms which accomplish the same end results may be used without departing from the spirit and scope of this invention.

Referring now more particularly to FIGS. 1 and 2, a pulley 168 is concentrically mounted on the shaft 23, and another pulley (indicated by the numeral 170 in FIG. 12) is concentrically mounted on the shaft 22. A sensing cable 172 made of some suitable dielectric material, such as nylon, is passed partially around the pulley segment 84 shown in FIG. 4 and is secured at one end thereof to the point 174 on this segment. This cable 172 passes through the interior of the housing 32 and the boom 24, and further passes around the pulley 168 and backwardly through the interior of the lower boom 20. As shown in FIG. 1, at the lower end of the boom 20 the cable 172 passes over the idler 114 downwardly and under the pulley 120, then upwardly and over the pulley 116 and then downwardly under the pulley 170 (FIG. 12) to a terminal 176 which is secured to the support 18. The diameters of the pulleys 84, 168 and 170 are equal for reasons which will become apparent from the following description.

Figure 12:
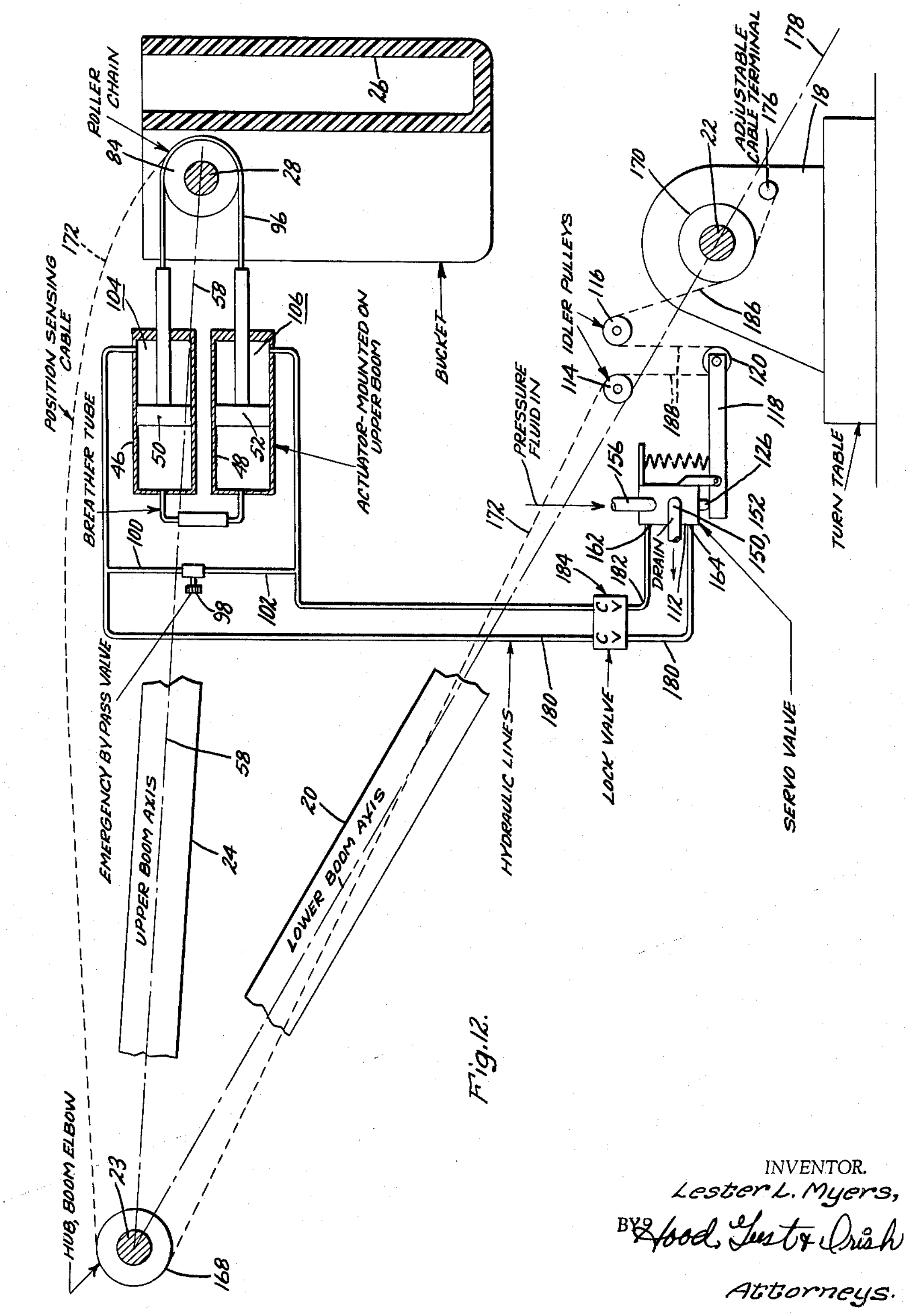
FIG. 12 is a diagrammatic illustration of the bucket-leveling mechanism employed in the structure of FIGS. 1 and 2.

Continuing with the description, reference is now made to FIG. 12 wherein like numerals will indicate like parts. This figure is a diagrammatic illustration of the mechanism previously described and is useful as a simplification thereof in explaining the essential operational features of the invention. The upper boom axis 58 passes through the centers of the two shafts 23 and 28, respectively. The lower boom axis 178 passes through the centers of the two shafts 22 and 23, respectively. The two pulleys 114 and 116 are shown in FIG. 12 in proper positional relationship with respect to the lower boom axis 178 and also with respect to the periphery of the pulley 170.

The hydraulic system which interconnects the servo valve 112 and the two power cylinders 46 and 48 comprises the two hydraulic lines 180 and 182 which are respectively connected to the compartments 104 and 106 of the two power cylinders. The other ends of these two lines 180 and 182 are respectively connected to the control passages 164 and 162 of the valve 112. A suitable, two-section lock valve indicated generally by the reference numeral 184 is connected in series with the two lines 180 and 182; however, this lock valve normally performs no function in interrupting the flow in the two lines 180 and 182 individually except under certain circumstances which will be described later. However, for the moment, it may be considered that the lock valve 184 permits full flow through the individual lines 180 and 182.

In operation, let it be assumed that the two booms 20 and 24 are stationary in the positions shown in FIG. 12 and that all of the other parts are in the positions shown. Also let it be assumed that the personnel bucket 26 is horizontal (in other words, the bottom or floor is level) and that the cable 172 is tensioned such as to hold the operating lever 118 in neutral position. In neutral position, the valve 112 severs communication between the lines 180, 182 and any other part of the system connected to the valve 112. In other words, the lower ends of the two lines 180 and 182 are closed off. Also, it may be assumed that with the valve 112 in neutral position, hydraulic fluid is trapped in the lines 180, 182 and in the two compartments 104 and 106 such that the pistons 50 and 52 are locked in the positions shown. Being thus locked, the sprocket 84 is positioned such that the bucket 26 is positively held in a locked, level position. In this locked position, the hand valve 98 is turned off so as to sever communication between the two lines 100 and 102.

While in FIG. 12 the cable 172 extending from the pulley segment 84 to the pulley 168 is shown curved, in actuality it is taut or tensioned. In an operating embodiment of this invention, the cable 172 in neutral position is under a tension of about twelve pounds, and instead of being curved inside the upper boom as shown is straight. The curvature is used as a convenient method of illustrating the presence of the cable 172 and the operating features thereof. It should also be remembered at this point that the radii of the pulley segment 84 and the pulleys 168 and 170 are equal.

If as the first step of operation it is assumed that the lower boom 20 is pivoted upwardly about its shaft 22 by a desired amount, in the elevating movement the cable 172 in the vicinity of 186 will wind more onto the pulley 170. This results in drawing the cable 172 toward the pulley 170 and in the process shortens the cable loop 188 thereby raising the pulley 120 and arm 118. This shortening of the cable loop 188 occurs because the bucket 26 is held stationary by the two cylinders 46 and 48 such that when some of the cable in the region 186 is wrapped onto the pulley 170, the only slack in the cable which can be taken up is that contained in the loop 188.

Raising of the lever 118 actuates the valve 112 such that oil under pressure passes through the valve 112 into and through the line 180 to the cylinder compartment 104. At the same time, oil from the cylinder compartment 106 passes outwardly thrugh the line 182, into the valve 112, and out of the drain 150, 152. This results in counterclockwise rotation of the shaft 28 which rotates the bucket 26 correspondingly. If not thus rotated, this bucket would be tipped with the upper right-hand edge thereof being forward of the bottom edge upon raising of the lower boom 20, but with this rotation of the shaft 28 in a counterclockwise direction, the bucket 26 is moved in a direction opposite to the tilting. As a consequence of shaft 28 rotating counterclockwise, the pulley segment 84 also rotates counterclockwise and pays out some cable 172. This paying out results in a lengthening of the cable loop 188 which permits the arm 118 to drop such that when the valve spool 126 reaches its neutral position, the two lines 180 and 182 will be cut off, thereby trapping liquid in the compartments 104 and 106. The cable length, pulley dimensions and the like are so selected that the bucket 26 will be stopped in level position for any pivoted position of the booms 20 and 24, and this is controlled by the cable loop 188 which positions the valve 112 in neutral position when the bucket 26 is level. The valve 112 thereupon becomes a servo mechanism which follows up information fed back from the bucket 26 via the cable 172.

The servo mechanism is operable as aforedescribed with the lower boom 20 stationary and the upper boom 24 pivoting about its shaft 23. For example, if it is assumed that the upper boom 24 is pivoted upwardly from the illustrated position of FIG. 12, this results in paying out some of the cable wrapped around the pulley 168, such that when this occurs, the cable loop 188 lengthens and the operating lever 118 drops, thereby introducing pressure fluid into line 182 and connecting line 180 to an atmospheric drain. The chamber 106 receives pressure fluid, driving piston 52 toward the left, carrying bucket 26 clockwise to a level position. When the motion of the upper boom 24 is stopped, the bucket 26 will continue its clockwise rotation only momentarily until it is exactly level, at which time the cable loop 188 will be drawn to the precise length which positions the servo valve 112 in neutral.

If the upper boom 24 is lowered from its illustrated position, while the lower boom is stationary, more cable will be wrapped around the pulley 168 thereby resulting in shortening of the cable loop 188 and consequent rotation, counterclockwise, of the bucket 26 in maintaining the latter level.

From the foregoing description, it will be apparent that irrespective of the motions of the lower and upper booms 20, 24, the servo mechanism will at all times maintain the bucket 26 level. If for some reason the servo valve 112, the cable 172 or the like should become inoperative, the tower may still be safely operated by opening the valve 98 which is positioned adjacent to the personnel in the bucket 26. When this valve 98 is opened, the two compartments 104 and 106 are placed into full communication with each other, such that oil can freely flow therebetween. With the bucket 26 suspended as a pendulum and on a vertical line which passes through its center of gravity, it normally will hang to a level position such that with the valve 98 open, the bucket 26 will freely swing as the booms pivot, and will always maintain itself in level position. Therefore, the arrangement is safe even though the power mechanism may fail.

Figure 11:
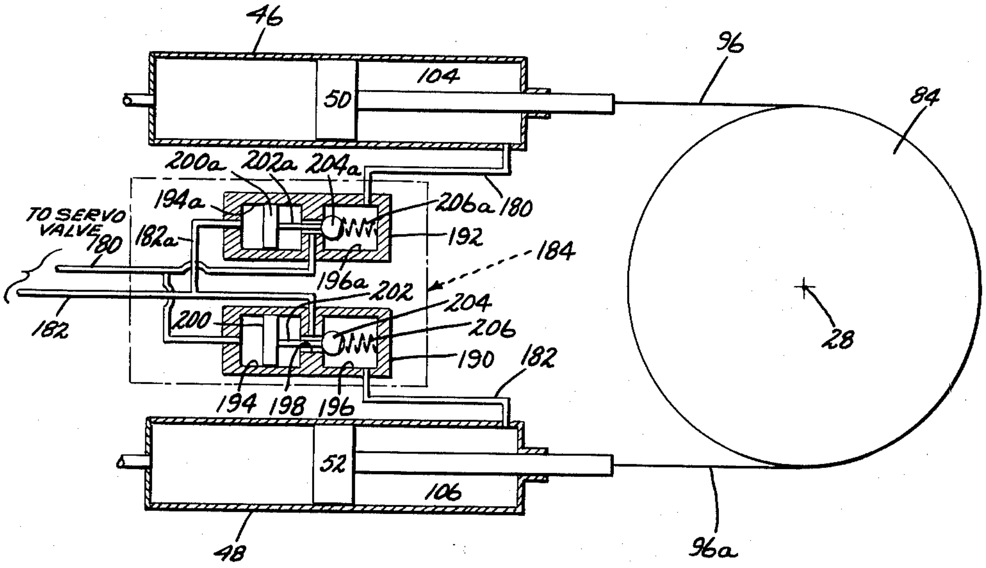
FIG. 11 is a diagrammatic illustration of the lock valve employed in the arrangement of FIGS. 1 and 2.

Since personnel are free to move about in the bucket 26 and can lean forwardly, rearwardly, or to the side, it could happen that the bucket be overbalanced in one direction and that this overbalancing affect the operation of the entire leveling system. For example, if it is assumed that the mechanism is operating in such a manner as to rotate the bucket 26 clockwise and in order to do this power is applied to cylinder 48, a workman in the bucket 26 leaning over the upper right-hand edge (FIG. 12) of the bucket 26 could apply his weight in such a direction as to increase the clockwise turning moment. Since the compartment 104, in this situation, is connected to atmosphere, the piston 50 could be drawn toward the right more rapidly than the pressure fluid would force the piston toward the left. This would result in the chain 96 between the piston 52 and sprocket 84 becoming slack and perhaps further permitting the bucket 26 to swing freely clockwise such that a workman in the bucket might inadvertently be placed in a position where he could fall out of the bucket. Thus, it is desirable that some means be provided for preventing the weight of the workman from affecting the operation of the leveling system whereby the bucket 26 cannot forcefully be rotated out of the control of the leveling system. Such regulation is provided by means of the lock valve 184 which is of conventional construction. This lock valve 184 is diagrammatically illustrated in FIG. 11, wherein like numerals indicate like parts. The lock valve is divided into two valve assemblies, one being indicated by the numeral 190 and the other by the numeral 192. These two valve assemblies 190 and 192 are identically constructed such that a description of one will suffice for both. Considering the assembly 192, it is provided with two cylindrical chambers 190 and 196 which are connected together by means of a coaxial passage 198. Line 182 connects directly to the passage 198 and line 180 connects directly to the left-hand end of the chamber 194. This latter chamber 194 receives a piston member 200 having a finger coaxially secured thereto which projects through the opening 198 and engages a ball valve 204 which seats over the end of the passage 198. A helical compression spring 206 forces the ball valve 204 into sealing engagement with the passage 198 end, such that communication between the two chambers 194 and 196 can be completely cut off.

In normal operation, when line 182 is pressurized and line 180 is connected to a drain tank at atmospheric pressure, liquid is forced through the line 182 first into the passage 198 and against the ball 204. This pressure unseats the ball 204 against the force of the spring 206 such that the fluid passes onwardly to the compartment 106 for operating the piston 52. At the same time, pressure fluid from line 182 also passes through branch line *182a* and enters the chamber *194a* where it acts against the piston member *200a*. This unseats the ball valve *204a* thereby permitting liquid in the compartment 104 to exhaust through the line 180 into the chamber *196a* and onwardly through the line 180. Thus, piston 52 is moving leftwardly while piston 50 is moving toward the right. Now if it should develop that the sprocket 84 is forced clockwise sufficiently to overtake the piston 52 and produce slack in chain portion *96a*, this would result in the pressure in the chamber 106 dropping to zero or atmospheric under which condition the spring 206 would close the valve 204. The reason for this drop is due to the fact that the generation of pressure from the source of pressure fluid does not keep up with the momentary rapid movement of the piston 52. Simultaneously, the piston member 200*a* has moved leftwardly under the influence of the spring 206*a*, permitting the valve 204*a* to close. This positively stops further rotation clockwise of the sprocket 84. Immediately following this, pressure starts to build up in line 182 such that when it reaches its operating value, ball 204 is again unseated, admitting pressure fluid into the chamber 106 which moves the piston 52 in a direction to take up any slack in chain section 96*a* which may have been present. Thus, the sprocket 84 is positively controlled in its movement and cannot be caused to move faster than the hydraulic system will allow by personnel or weight in the bucket.

The cycle of operation for reverse movements of the pistons 50 and 52 is the same as just stated, with the exception that the two assemblies 190 and 192 perform the opposite functions.

As will now be apparent to a person skilled in the art, the pulleys 170, 168 and 84 need not be in the form of complete circles, but need have only part circular shapes. For example, pulley segment 84 as shown in FIG. 4 is in the form of a semicircle. Pulley segment 168 could also be in the form of a semicircle and still perform the desired function. The same is true of pulley 170. Also, these pulleys 84, 168 and 170 could be mere drums or cylinders or parts thereof, such that it is not critical as to the precise cylindrical or circular shape involved. Additionally, these elements 84, 168 and 170 need not be precisely circular but can instead be composed of segments or parts which are poly-sided such that the element 84 could be a part of an octagon as could the other parts of 186 and 170. The term "pulley device" as used hereinbefore and hereinafter in the claims is therefore intended to cover all of these functionally equivalent devices.

Also, the two booms 20 and 24 join in an elbow which is defined by the shaft 23 and pulley device 168. In order for the servo system to operate as intended, this elbow is provided with a rounded surface for the cable 172 to pass around. In the claims, this surface for the cable 172 to pass around at the elbow is termed as an "arcuate surface."

Brief reference to FIG. 12 reveals that as the booms 20 or 24 pivot, the cable 172 is momentarily either payed out or wrapped such that the length thereof from the point of departure from the segment 170 toward the shaft 23 and the point of departure from the segment 84 toward the shaft 23 is either shortened or lengthened. This shortening or lengthening results in corresponding changes in dimension of the cable loop 188. Therefore, the length of this cable 172 between the first points of contact with the pulley devices 84 and 170 is termed the "effective length." It is of course realized that the length of the cable 172 between the points 176 and 174 (FIG. 4) never changes; however, the "effective length" between the adjacent points of contact on the pulley devices 84 and 170 does change. When the "effective length" of the cable does change, the servo mechanism is brought into action for leveling the personnel bucket 26.

Figure 13:
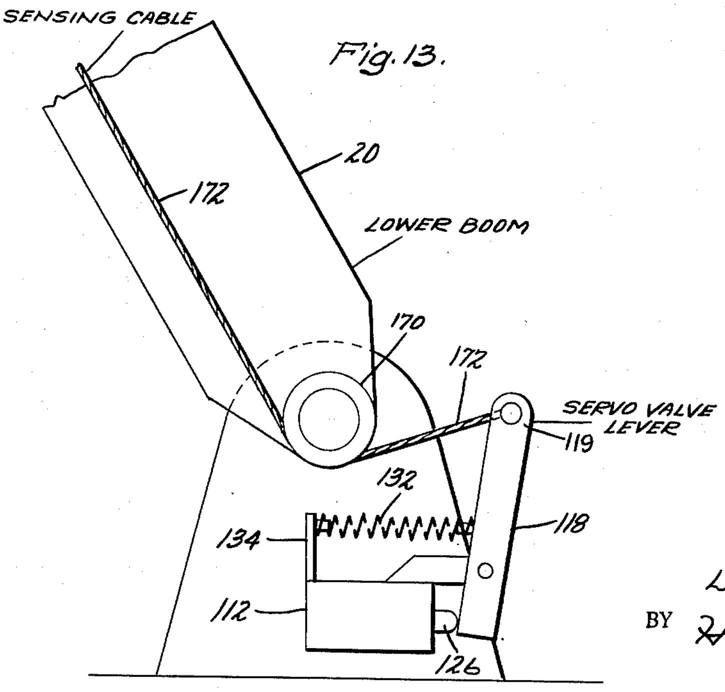
FIG. 13 is a fragmentary side view of an alternative embodiment of this invention.

An alternative servo arrangement is shown in FIG. 13 wherein like numerals indicate like parts. Here the servo valve 112 is fixedly mounted on the frame 18 with the lever arm 118 being substantially upright. The cable 172 is not provided with a loop 188, but instead is taut between the pulleys 168 and 170. Instead of being connected to a fixed terminal 176, it is connected to the upper end 119 of the lever 118. It also passes part way around the pulley 170 as shown and connects to the upper end 119 which extends to a vertical position approximately level with the axis of pulley 170. In operation, the lever 118 (FIG. 13) is swung about its pivot the same as the lever 118 of FIG. 12 in response to pivotal movement of booms 20, 24 and bucket 26. Instead of relying upon a loop 188 to actuate the valve 112 (FIG. 12), the shortening and elongating of the cable between the lever end 119 (FIG. 13) and the point of departure from the pulley 84 serves the same purpose. Raising of the boom 20, for example, (FIG. 13), wraps cable around pulley 170 thereby pulling arm 118 (FIG. 13) toward the left and actuating valve 112. The bucket 26 is thereupon turned counterclockwise (as viewed in FIG. 12) thereby lengthening cable 172 and permitting arm 118 (FIG. 13) to swing clockwise until neutral is reached. Lowering of the boom 20 produces the same action in reverse. It will thus be seen that the two arrangements of FIGS. 12 and 13 are equivalent.

All of the parts which extend up the booms to the bucket 26 are made of a suitable insulating material. The cable 172 is preferably made of nylon, and the hydraulic lines 180 and 182 are preferably made of a suitable plastic material such as polyethylene. The fluid used in the hydraulic system is preferably an insulating oil, and the booms 20 and 24 are made of Fiberglas and plastic. Thus, the personnel bucket 26 is totally and completely insulated from the vehicle or support 18, and with the total boom 20, 24 length approximating fifty feet, the total insulating value between the bucket 26 and earth is approximately one megavolt. This dielectric strength in the total structure is capable of being maintained over substantially long periods of use by reason of the fact that the boom 24 is provided with a bulk head at 25 (FIGS. 1 and 2) which is suitably apertured for receiving the cable 172 as well as the other control lines therethrough. Since very little moisture and dirt can pass through these apertures, the interior of the boom 24 can be maintained relatively clean and dry. The insulating properties of this boom interior are thereby preserved. Also, preferably a moisture-indicating device 27 including cobalt treated silica gel is inserted in the boom so as to remove moisture and to indicate by a pink color that the moisture content is too high. If the moisture content is indicated as being too high, then personnel are warned that the tower should not be used until the boom interior is cleaned or dried out.

While I have described above the principles of my invention in connection with specific apparatus, it is to be clearly understood that this description is made only by way of example and not as a limitation to the scope of my invention.

What is claimed is:

1. For an aerial tower, a platform-leveling mechanism comprising supporting frame means, a lower boom, a first horizontal shaft pivotally connecting one end of said boom to said frame means, an upper boom having opposite first and second ends, a second horizontal shaft pivotally connecting the first end of said upper boom to the other end of said lower boom, a platform having a center of gravity, a third horizontal shaft pivotally connecting said platform at a point located above said center of gravity to the second end of said upper boom, the axes of said shafts extending transversely of the longitudinal axes of said booms and being substantially parallel to each other, a first pulley device concentrically mounted on said first shaft, a second pulley device concentrically mounted on said second shaft, a third pulley device concentrically secured to said third shaft, said third shaft being secured to said platform, a sensing cable at least partially wrapped around said third pulley device and being secured at an end thereto, said sensing cable passing through said upper boom, over said second pulley device, through said lower boom, at least partially around said first pulley device and being secured at its other end to said frame means, said cable engaging the upper side of said third pulley device and the underside of the first pulley device, said cable having an effective length which varies in response to pivotal movement of any one of said booms and said platform, said effective length being measured between the point of departure of said cable from said first pulley device on the side adjacent said second shaft and the point of departure from said third pulley device on the side adjacent said second shaft, two spaced apart idler pulleys mounted on said lower boom adjacent to said one end, the idler pulley adjacent to said first shaft being disposed above the longitudinal axis of said lower boom, the axis of said first shaft being intersected by said lower boom axis, a servo valve mounted on said lower boom having an operating lever which carries an operating pulley on the end thereof, said operating pulley being disposed below and between said idler pulleys on a line normal to a line extending between the axes of said idler pulleys, said cable passing under said operating pulley and upwardly and over said idler pulleys whereby alternatively increasing and decreasing said effective length results in corresponding lowering and raising said operating lever, said cable being taut and having a predetermined effective length which positions said servo valve in neutral when said platform is level, means yieldably urging said operating lever in a direction which engages said operating pulley with said cable, a sprocket concentrically secured to said third shaft, a pair of hydraulic power cylinders having reciprocable pistons, respectively, secured within said upper boom adjacent to said second end, the axes of said cylinders being substantially parallel to the longitudinal axis of said upper boom and also defining a plane which passes through said sprocket normal to said third shaft axis, a chain passed around said sprocket and being operatively secured at its opposite ends to the two pistons, respectively, of said cylinders, each cylinder being divided into two compartments by its piston, one of said compartments on the side of each piston adjacent to said sprocket being sealed against fluid leakage and having a port for connection to a fluid pressure system, two fluid pressure lines extending internally of said booms from said cylinders at one end to said servo valve at the other end, said one end of said two lines being connected, respectively, to the ports of said two cylinders, the other end of said two lines being operatively connected, respectively, to said servo valve, a lock valve operatively connected in series with said two lines, respectively, a normally closed manually operable by-pass valve connected between said lines at a point adjacent to said cylinders, a source of fluid under pressure coupled to said servo valve, said servo valve including means for alternatively connecting said source to said two lines, respectively, in response to movement of said operating lever to opposite positions from neutral, said lock valve including means for passing fluid along said lines individually between said servo valve and said two cylinders, respectively, said lock valve also including means for regulating the pressure of the fluid communicated to said cylinders for maintaining said chain taut at all times, said servo valve including measn for draining fluid from the one of said lines not receiving pressure fluid, said sensing cable, said fluid lines and said booms being formed of electrical insulating material, and means including said platform for electrically insulating said platform from said frame.

2. The mechanism of claim 1 wherein said platform is a personnel bucket and said third shaft is secured to the upper end portion thereof, said bucket having two spaced personnel-carrying portions disposed opposite the ends, respectively, of said third shaft, said bucket being formed of an electrical insulating material.

3. The mechanism of claim 1 wherein said servo valve includes a body having a valve bore therein, a valve spool reciprocably received by said bore, said operating lever being pivotally connected between its ends to said body, the end of said lever opposite said operating pulley operatively engaging one end of said valve spool, first spring means operatively engaging and yieldably urging said spool into engagement with said lever, second spring means operatively engaging and yieldably urging said lever into engagement with said spool in opposition to said first spring means, said second spring means exerting a force which is capable of moving said spool against the force of said first spring means, said second spring means urging said operating pulley against said cable in a direction to tighten the latter, and port means including portions of said valve body and spool for alternatively connecting pressure fluid to said two lines, respectively, and for draining the line not having pressure fluid connected thereto in response to movement of said spool in opposite directions from neutral position, said port means including means for sealing said lines when said spool is in neutral position.

4. For an aerial tower, a platform-leveling mechanism comprising supporting frame means, a lower boom, a first horizontal shaft pivotally connecting one end of said boom to said frame means, an upper boom having opposite first and second ends, a second horizontal shaft pivotally connecting the first end of said upper boom to the other end of said lower boom, a platform having a center of gravity, a third horizontal shaft pivotally connecting said platform at a location above said center of gravity to the second end of said upper boom, the axes of said shaft extending transversely of the longitudinal axes of said booms and being substantially parallel to each other, a first pulley device concentrically mounted on said first shaft, a second pulley device concentrically mounted on said second shaft, a third pulley device concentrically secured to said third shaft, said third shaft being secured to said platform, a sensing cable at least partially wrapped around said third pulley device and being secured at an end thereto, said sensing cable passing through said upper boom, over said second pulley device, through said lower boom, at least partially around said first pulley device and being secured at its other end to said frame means, said cable engaging the upper side of said third pulley device and the underside of the first pulley device, said cable having an effective length which varies in response to pivotal movement of any one of said booms and said platform, said effective length being measured between the point of departure of said cable from said first pulley device on the side adjacent to said second shaft and the point of departure from said third pulley device on the side adjacent to said second shaft, two spaced apart idler pulleys mounted on said lower boom adjacent to said one end, the idler pulley adjacent to said first shaft being disposed above the longitudinal axis of said lower boom, the axis of said first shaft being intersected by said lower boom axis, a servo valve mounted on said lower boom having an operating lever which carries an operating pulley on the end thereof, said operating pulley being disposed below and between said idler pulleys on a line normal to a line extending between the axes of said idler pulleys, said cable passing under said operating pulley and upwardly and over said idler pulleys whereby alternatively increasing and decreasing said effetcive length results in corresponding lowering and raising said operating lever, said cable being taut and having a predetermined effective length which positions said servo valve in neutral when said platform is level, means yieldably urging said operating lever in a direction which engages said operating pulley with said cable, a sprocket concentrically secured to said third shaft, a pair of hydraulic power cylinders having reciprocable pistons, respectively, secured within said upper boom adjacent to said second end, the axes of said cylinders being substantially parallel and also defining a plane which passes through said sprocket normal to said third shaft axis, a chain passed around said sprocket and being operatively secured at its opposite ends to the two pistons, respectively, of said cylinders, each cylinder being divided into two compartments by its piston, one of said compartments on the side of each piston adjacent to said sprocket being sealed against fluid leakage and having a port for connection to a fluid pressure system, two fluid pressure lines extending internally of said booms from said cylinders at one end to said servo valve at the other end, said one end of said two lines being connected, respectively, to the ports of said two cylinders, the other end of said two lines being operatively connected, respectively, to said servo valve, a lock valve operatively connected in series with said two lines, respectively, a normally closed manually operable by-pass valve connected between said line at a point adjacent to said cylinders, a source of fluid under pressure coupled to said servo valve, said servo valve including means for alternatively connecting said source to said two lines, respectively, in response to movement of said operating lever to opposite positions from neutral; said lock valve including means for passing fluid along said lines individually between said servo valve and said two cylinders, respectively, said lock valve also including means for regulating the pressure of the fluid communicated to said cylinders for maintaining said chain taut at all times, said servo valve including means for draining fluid from the one of said lines not receiving pressure fluid.

5. For an aerial tower, a platform-leveling mechanism comprising supporting frame means, a lower boom, a first horizontal shaft pivotally connecting one end of said boom to said frame means, an upper boom having opposite first and second ends, a second horizonal shaft pivotally connecting the first end of said upper boom to the other end of said lower boom, a platform having a center of gravity, a third horizontal shaft pivotally connecting said platform at a location above said center of gravity to the second end of said upper boom, the axes of said shafts extending transversely of the longitudinal axes of said booms and being substantially parallel to each other, a first pulley device concentrically mounted on said first shaft, a second pulley device concentrically mounted on said second shaft, a third pulley device concentrically secured to said third shaft, said third shaft being secured to said platform, a sensing cable at least partially wrapped around said third pulley device and being secured at an end thereto, said sensing cable passing through said upper boom, over said second pulley device, through said lower boom, at least partially around said first pulley device and being secured at its other end to said frame means, said cable engaging the upper side of said third pulley device and the underside of the first pulley device, said cable having an effective length which varies in response to pivotal movement of any one of said booms and said platform, said effective length being measured between the point of departure of said cable from said first pulley device on the side adjacent to said second shaft and the point of departure from said third pulley device on the side adjacent to said second shaft, two spaced apart idler pulleys mounted on said lower boom adjacent to said one end, the idler pulley adjacent to said first shaft being disposed above the longitudinal axis of said lower boom, the axis of said first shaft being intersected by said lower boom axis, a servo valve mounted on said lower boom having an operating lever which carries an operating pulley on the end thereof, said operating pulley being disposed below and between said idler pulleys on a line normal to a line extending between the axes of said idler pulleys, said cable passing under said operating pulley and upwardly and over said idler pulleys whereby alternatively increasing and decreasing said effective length results in corresponding lowering and raising said operating lever, said cable being taut and having a predetermined effective length which positions said servo valve in neutral when said platform is level, means yieldably urging said operating lever in a direction which engages said operating pulley with said cable, a sprocket concentrically secured to said third shaft, a pair of hydraulic power cylinders having reciprocable pistons, respectively, secured within said upper boom adjacent to said second end, the axes of said cylinders being substantially parallel and also defining a plane which passes through said sprocket normal to said third shaft axis, a chain passed around said sprocket and being operatively secured at its opposite ends to the two pistons, respectively, of said cylinders, each cylinder being divided into two compartments by its piston, one of said compartments on the side of each piston adjacent to said sprocket being sealed against fluid leakage and having a port for connection to a fluid pressure system, two fluid pressure lines extending internally of said boom from said cylinders at one end to said servo valve at the other end, said one end of said two lines being connected, respectively, to the ports of said two cylinders, the other end of said two lines being operatively connected, respectively, to said servo valve, a normally closed manually operable by-pass valve connected between said lines at a point adjacent to said cylinders, a source of fluid under pressure coupled to said servo valve, said servo valve including means for alternatively connecting said source to said two lines, respectively, in response to movement of said operating lever to opposite positions from neutral, said servo valve including means for draining fluid from the one of said lines not receiving pressure fluid.

6. For an aerial tower, a platform-leveling mechanism comprising supporting frame means, a lower boom, a first horizontal shaft pivotally connecting one end of said boom to said frame means, an upper boom having opposite first and second ends, a second horizontal shaft pivotally connecting the first end of said upper boom to the other end of said lower boom, a platform having a center of gravity, a third horizontal shaft pivotally connecting said platform at a location above said center of gravity to the second end of said upper boom, the axes of said shafts extending transversely of the longitudinal axes of said booms and being substantially parallel to each other, a servo valve mounted on said frame means, an operating lever pivotally mounted at one of its two ends on said servo valve, said operating lever being movable between two extreme positions from an intermediate neutral position, a first pulley device concentrically mounted on said first shaft, a second pulley device concentrically mounted on said second shaft, a third pulley device concentrically secured to said third shaft, said third shaft being mounted on said platform, a sensing cable at least partially wrapped around said third pulley device and being secured at an end thereto, said sensing cable passing through said upper boom, over said second pulley device, through said lower boom, at least partially around said first pulley device and being secured at its other end to the other end of said operating arm, said cable engaging the upper side of said third pulley device and the underside of the first pulley device, said cable having an effective length which varies in response to pivotal movement of any one of said booms and said platform, said effective length being measured between the point of departure of said cable from said first pulley device on the side adjacent to said second shaft and the point of departure from said third pulley device on the side adjacent to said second shaft, the alternative increasing and decreasing of said effective length serving to move correspondingly said operating lever between said two extreme positions, said cable being taut and having a predetermined effective length which positions said operating lever in neutral when said platform is level, means yieldably urging said operating lever in a direction which tightens said cable, a sprocket concentrically secured to said third shaft, a pair of hydraulic power cylinders having reciprocable pistons, respectively, secured within said upper boom adjacent to said second end, the axes of said cylinders being substantially parallel and also defining a plane which passes through said sprocket normal to said third shaft axis, a chain passed around said sprocket and being operatively secured at its oppoiste ends to the two pistons, respectively, of said cylinders, each cylinder being divided into two compartments by its piston, one of said compartments on the side of each piston adjacent to said sprocket being sealed against fluid leakage and having a port for connection to a fluid pressure system, two fluid pressure lines extending internally of said booms from said cylinders at one end to said servo valve at the other end, said one end of said two lines being connected, respectively, to the ports of said two cylinders, the other end of said two lines being operatively connected, respectively, to said servo valve, a normally closed manually operable by-pass valve connected between said lines at a point adjacent to said cylinders, a source of fluid under pressure coupled to said servo valve, said servo valve including means for alternatively connecting said source to said two lines, respectively, in response to movement of said operating lever to opposite positions from neutral, said servo valve including means for draining fluid from the one of said lines not receiving pressure fluid.

7. For an aerial tower, a platform-leveling mechanism comprising supporting frame means, a lower boom, a first horizontal shaft pivotally connecting one end of said boom to said frame means, an upper boom having opposite first and second ends, a second horizontal shaft pivotally connecting the first end of said upper boom to the other end of said lower boom, a platform, a third horizontal shaft pivotally connecting said platform to the second end of said upper boom, the axes of said shafts extending transversely of the longitudinal axes of said booms and being substantially parallel to each other, a first pulley device concentrically mounted on said first shaft, a second pulley device concentrically mounted on said second shaft, a third pulley device concentrically secured to said third shaft, said third shaft being secured to said platform, a sensing cable at least partially wrapped around said third pulley device and being secured at an end thereto, said sensing cable passing through said upper boom, over said second pulley device, through said lower boom, at least partially around said first pulley device and being operatively secured at its other end to said frame means, said cable engaging the upper side of said third pulley device and the underside of the first pulley device, said cable having an effective length which varies in response to pivotal movement of any one of said booms and said platform, said effective length being measured between the point of departure of said cable from said first pulley device on the side adjacent to said second shaft and the point of departure from said third pulley device on the side adjacent to said second shaft, a sprocket concentrically secured to said third shaft, a pair of hydraulic power cylinders having reciprocable pistons, respectively, secured within said upper boom adjacent to said second end, the axes of said cylinders being substantially parallel and also defining a plane which passes through said sprocket normal to said third shaft axes, a chain passed around said sprocket and being operatively secured at its opposite ends to the two pistons, respectively, of said cylinders, each cylinder being divided into two compartments by its piston, one of said compartments on the side of each piston adjacent to said sprocket being sealed against fluid leakage and having a port for connection to a fluid pressure system, two fluid pressure lines, servo valve means for selectively controlling the direction of flow of fluid through said two fluid pressure lines, said lines being connected at one end to the ports of said two cylinders, respectively, the other end of said two lines being connected, respectively, to said servo valve means, a source of fluid under pressure coupled to said servo valve means, means connecting said servo valve means to said cable for actuating said servo valve means oppositely, respectively, in response to increasing and decreasing the aforesaid effective length of said cable from a predetermined value, said servo valve means including means for alternatively connecting said source to said two lines, respectively, in response to increasing and decreasing said effective length and for severing communication of said source from said two lines when said effective length is of said predetermined value.

8. The mechanism of claim 7 wherein said servo valve means comprises two spaced apart idler pulleys mounted on said lower boom adjacent to said one end, a servo valve mounted on said lower boom having an operating lever which carries an operating pulley on the end thereof, said operating lever being movable between two extreme positions from an intermediate neutral position, said operating pulley being disposed below said idler pulleys, said cable passing under said operating pulley and upwardly and over said idler pulleys whereby alternatively increasing and decreasing said effective length results in corresponding lowering and raising said operating lever, said cable being taut and having a predetermined effective length which positions said servo valve in neutral when said platform is level, and means yieldably urging said operating lever in a direction which engages said operating pulley with said cable.

9. The mechanism of claim 7 wherein said servo valve means comprises a servo valve mounted on said frame means, an operating lever pivotally mounted at one of its two ends on said servo valve, said operating lever being movable between two extreme positions from an intermediate neutral position, said other cable end being connected to the other end of said operating lever, means yieldably urging said operating lever in a direction to tension said cable, said cable being taut and having a predetermined effective length which positions said operating lever in neutral position, said operating lever being disposed with respect to said cable such that reducing said effective length moves said operating lever to one of said extreme positions and increasing said effective length moves said operating lever to the other of said extreme positions.

10. For an aerial tower, a platform-leveling mechanism comprising a supporting frame means, a lower boom, a first horizontal shaft pivotally connecting one end of said boom to said frame means, an upper boom having opposite first and second ends, a second horizontal shaft pivotally connecting the first end of said upper boom to the other end of said lower boom, a platform, a third horizontal shaft pivotally connecting said platform to the second end of said upper boom, the axes of said shafts extending transversely of the longitudinal axes of said booms and being substantially parallel to each other, a first pulley device concentrically mounted on said first shaft, a second pulley device concentrically mounted on said second shaft, a third pulley device concentrically secured to said third shaft, said third shaft being secured to said platform, a sensing cable at least partially wrapped around said third pulley device and being secured at an end thereto, said sensing cable passing through said upper boom, over said second pulley device, through said lower boom, at least partially around said first pulley device and being operatively secured at its other end to said frame means, said sensing cable engaging the underside of said first pulley device and the upper side of said third pulley device, said sensing cable having a predetermined effective length between said first and third pulley devices when said platform is level, said effective length changing in response to pivotal movement of any one of said booms and platform, a sprocket concentrically secured to said third shaft, a pair of hydraulic power cylinders having reciprocable pistons, respectively, secured to said upper boom adjacent to said second end, the axes of said cylinders defining a plane which passes through said sprocket and is normal to said third shaft axis, a chain passed around said sprocket and being operatively secured at its opposite ends to the two pistons, respectively, of said cylinders, servo valve means for selectively operating said cylinders in one direction in response to an increase in the effective length of said cable and in the opposite direction in response to a decrease in the effective length of said cable for maintaining said platform level, said servo valve means including means for stopping operation of said cylinders in response to the effective length of said cable returning to the aforementioned predetermined length.

11. For an aerial tower, a platform-leveling mechanism comprising a supporting frame means, a lower boom, a first horizontal shaft means pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longitudinal axes of said booms and being substantially parallel to each other, said third shaft means being secured to said platform for rotation therewith, means provided with an arcuate surface mounted adjacent to said second shaft means, said arcuate surface being disposed such as to curve the apex portion of the angle formed between said booms, a sensing cable having opposite ends, means operatively securing one cable end to said platform at a point radially spaced from the axis of said third shaft means, said sensing cable passing through said upper boom, over said arcuate surface, through said lower boom, and being operatively secured at its other end to said frame means at a point radially spaced from said first shaft means, a sprocket concentrically secured to said third shaft means, a pair of hydraulic power cylinders having reciprocable pistons, respectively, secured to said upper boom adjacent to said second end, the axes of said cylinders defining a plane which passes through said sprocket and is normal to the axis of said third shaft means, a chain passed around said sprocket and being operatively secured at its opposite ends to the two pistons, respectively, of said cylinders, each cylinder being divided into two compartments by its piston, one of said compartments on the side of each piston adjacent to said sprocket being sealed against fluid leakage and having a port for connection to a fluid pressure system, two fluid pressure lines extending from said cylinders at one end, servo valve means for selectively controlling the direction of flow of pressure fluid through said two lines, means connecting said servo valve means to said cable for actuating said servo valve means oppositely, respectively, in response to increasing and decreasing the aforesaid effective length of said cable from a predetermined effective length.

12. The mechanism of claim 11 wherein said servo valve means comprises two spaced apart idler pulleys mounted on said lower boom adjacent to said one end, a servo valve mounted on said lower boom having an operating lever which carries an operating pulley on the end thereof, said operating lever being movable between two extreme positions from an intermediate neutral position, said operating pulley being disposed below said idler pulleys, said cable passing over said idler pulleys and being formed into a slack loop therebetween said operating pulley being engaged with the inside of said loop whereby alternatively shortening and lengthening said loop results in movement of said operating lever, said cable being taut and said loop of a predetermined length which positions said servo valve in neutral when said platform is level, and means yieldably urging said operating lever in a direction which engages said operating pulley with said loop.

13. The mechanism of claim 11 wherein said servo valve means comprises a servo valve mounted on said frame means, an operating lever piovtally mounted at one of its two ends on said servo valve, said operating lever being movable between two extreme positions from an intermediate neutral position, said other cable end being connected to the other end of said operating lever, means yieldably urging said operating lever in a direction to tension said cable, said cable being taut and having a predetermined effective length which positions said operating lever in neutral position, said operating lever being disposed with respect to said cable such that reducing said effective length moves said operating lever to one of said extreme positions and increasing said effective length moves said operating lever to the other of said extreme positions.

14. For an aerial tower, a platform-leveling mechanism comprising a supporting frame means, a lower boom, a first horizontal shaft means pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longtiudinal axes of said booms and being substantially parallel to each other, said third shaft means being secured to said platform for rotation therewith, means provided with an arcuate surface mounted adjacent to said second shaft means, said arcuate surface being disposed such as to curve the apex portion of the angle formed between said booms, a sensing cable having opposite ends, means securing one cable end to said platform at a point radially spaced from the axis of said third shaft means, said sensing cable passing along said upper boom, over said arcuate surface, along said lower boom, and being operatively secured at its other end to said frame means at a point radially spaced from the axis of said first shaft means, means for forming a loop in said cable which changes in dimension in response to pivotal movement of one of said booms and platform, a sprocket concentrically secured to said third shaft means, a pair of hydraulic power cylinders having reciprocable pistons, respectively, secured to said upper boom adjacent to said second end, the axes of said cylinder defining a plane which passes through said sprocket and is normal to said third shaft axis, a chain passed around said sprocket and being operatively secured at its opposite ends to the two pistons, respectively, of said cylinders, servo valve means operatively engaged with said cable loop and responsive to the changes in dimension thereof for selectively operating said cylinders in directions to maintain said platform level for different pivoted positions of said booms.

15. For an aerial tower, a platform-leveling mechanism comprising a supporting frame means, a lower boom, a first horizontal shaft means pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longitudinal axes of said booms and being substantially parallel to each other, said third shaft means being secured to said platform for rotation therewith, means provided with an arcuate surface mounted adjacent to said second shaft means, said arcuate surface being disposed such as to curve the apex portion of the angle formed between said booms, a sensing cable having opposite ends, means securing one cable end to said platform at a point radially spaced from the axis of said third shaft means, said sensing cable passing along said upper boom, over said arcuate surface, along said lower boom, and being operatively secured at its other end to said frame means at a point radially spaced from the axis of said first shaft means, a sprocket concentrically secured to said third shaft means, a pair of hydraulic power cylinders having reciprocable pistons, respectively, secured to said upper boom adjacent to said second end, the axes of said cylinders defining a plane which passes through said sprocket and is normal to said third shaft axis, a chain passed around said sprocket and being operatively secured at its opposite ends to the two pistons, respectively, of said cylinders, servo valve means operatively connected to said cable and responsive to movement thereof for selectively operating said cylinders in directions to maintain said platform level for different pivoted positions of said booms.

16. The mechanism of claim 15 wherein said servo valve means is mounted on said frame means and has an operating lever which is connected to said cable for movement in response to movement of said cable.

17. The mechanism of claim 16 wherein said actuating means includes a sensing cable connected to said platform and extended along said boom, means for exerting selectively forces on said cable in relaxing and tensioning directions in response to opposite pivotal movements, respectively, of said boom, said control means including means responsive to the tensioning and relaxing forces on said cable for controlling the operation of said motor means in directions to maintain said platform level during changes in the pivoted position of said boom.

18. For an aerial tower, a platform-leveling mechanism comprising a supporting frame means, a lower boom, a first horizontal shaft means pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longitudinal axes of said booms and being substantially parallel to each other, said third shaft means being secured to said platform for rotation therewith, means provided with an arcuate surface mounted adjacent to said second shaft means, said arcuate surface being disposed such as to curve the apex portion of the angle formed between said booms, a sensing cable having opposite ends, means securing one cable end to said platform at a point radially spaced from the axis of said third shaft means, said sensing cable passing along said upper boom, over said arcuate surface, along said lower boom, and being secured at its other end to said frame means at a point radially spaced from the axis of said first shaft means, means for forming a loop in said cable which changes in dimension in response to pivotal movement of one of said booms and platform, motor means connected to said platform for pivoting the same relative to said upper boom, and control means operatively engaged with said cable loop and responsive to changes in dimensions thereof for selectively operating said motor means in directions to maintain said platform level for different pivoted positions of said booms.

19. For an aerial tower, a platform-leveling mechanism comprising a supporting frame means, a lower boom, a first horizontal shaft means pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longitudinal axes of said booms and being substantially parallel to each other, said third shaft means being secured to said platform for rotation therewith, means provided with an arcuate surface mounted adjacent to said second shaft means, said arcuate surface being disposed such as to curve the apex portion of the angle formed between said booms, a sensing cable having opposite ends, means securing one cable end to said platform at a point radially spaced from the axis of said third shaft means, said sensing cable passing along said upper boom, over said arcuate surface, along said lower boom, and being secured at its other end to said frame means at a point radially spaced from the axis of said first shaft means, motor means connected to said platform for pivoting the same relative to said upper boom, and control means operatively engaged with said cable and responsive to movement of said cable for selectively operating said motor means in directions to maintain said platform level for different pivoted positions of said booms.

20. For an aerial tower, a platform-leveling mechanism comprising a supporting frame means, a lower boom, a first horizontal shaft means pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longitudinal axes of said booms and being substantially parallel to each other, said third shaft means being secured to said platform for rotation therewith, means provided with an arcuate surface mounted adjacent to said second shaft means, said arcuate surface being disposed such as to curve the apex portion of the angle formed between said booms, a sensing cable having opposite ends, means operatively securing one end of said cable to said platform at a point radially spaced from the axis of said third shaft means, said sensing cable passing along said upper boom, over said arcuate surface, along said lower boom and being secured at its other end to said frame means at a point radially spaced from the axis of said first shaft means, means for forming a loop in said cable which changes in dimension in response to pivotal movement of one of said booms and platform, a double acting hydraulic motor device means connecting said motor device to said third shaft means for selectively pivoting said platform in opposite directions with respect to said upper boom, and control means operatively engaged with said cable loop and responsive to changes in the dimensions thereof for selectively operating said motor device in directions to maintain said platform level for different pivoted positions of said booms.

21. For an aerial tower, a platform-leveling mechanism comprising a supporting frame means, a lower boom, a first horizontal shaft pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longitudinal axes of said booms and being substantially parallel to each other, said third shaft means being secured to said platform for rotation therewith, means provided with an arcuate surface mounted adjacent to said second shaft means, said arcuate surface being disposed such as to curve the apex portion of the angle formed between said booms, a sensing cable having opposite ends, means operatively securing one end of said cable to said platform at a point radially spaced from the axis of said third shaft means, said sensing cable passing along said upper boom, over said arcuate surface, along said lower boom and being secured at its other end to said frame means at a point radially spaced from the axis of said first shaft means, a double acting hydraulic motor device, means connecting said motor device to said third shaft means for selectively pivoting said platform in opposite directions with respect to said upper boom, and control means operatively engaged with said cable and responsive to changes in movement thereof for selectively operating said motor device in directions to maintain said platform level for different pivoted positions of said booms.

22. For an aerial tower, a platform-leveling mechanism comprising a supporting frame means, a lower boom, a first horizontal shaft means pivotally connecting one end of said boom to said frame means, an upper boom having opposite first and second ends, a second horizontal shaft means pivotally connecting the first end of said upper boom to the other end of said lower boom, said booms defining an angle having an apex in the region of said second shaft means, a platform, a third horizontal shaft means pivotally connecting said platform to the second end of said upper boom, the axes of said shafts extending transversely of the longitudinal axes of said booms and being substantially parallel to each other, a sensing cable, means securing said cable to said platform at a point radially spaced from the axis of said third shaft means, means mounting said cable on said booms for alternatively exerting opposite forces thereon in directions of increasing and relaxing the tension thereof in response to opposite pivotal movements, respectively, of one of said booms and platforms, motor means for pivoting said platform with respect to said upper boom, and control means operatively engaged with said cable and responsive to the tensioning and relaxing forces applied thereto for selectively operating said motor means in directions which maintain said platform level for different pivoted positions of said booms.

23. For an aerial tower, a platform-leveling mechanism comprising supporting frame means, an elongated boom having opposite ends, first means pivotally mounting said boom at one end on said frame means for pivotal movement about a horizontal axis, a platform, second means pivotally mounting said platform on the other end of said boom for pivotal movement about a horizontal axis, said second means including a substantially horizontal shaft secured to said platform for rotation therewith, a sensing cable having opposite ends, means securing one cable end to said platform at a point radially spaced from the axis of said shaft, means securing the other end of said cable to said frame means at a point radially spaced from the axis of the first-mentioned pivotal mounting, said cable extending along said boom, means forming said cable into a loop and including means for changing the dimensions of said loop in relation to changes in pivoted position of said boom, hydraulic motor means connected to said boom and to said shaft for selectively rotating said shaft in opposite directions, and servo valve means operatively connected to said cable loop and to said motor means and responsive to changes in dimension of said loop for selectively operating said motor means in directions to maintain said platform level for changing pivoted positions of said boom.

24. For an aerial tower, a platform-leveling mechanism comprising supporting frame means, an elongated boom having opposite ends, first means pivotally mounting said boom at one end on said frame means for pivotal movement about a horizontal axis, a platform, second means pivotally mounting said platform on the other end of said boom for pivotal movement about a horizontal axis, said second means including a substantially horizontal shaft secured to said platform for rotation therewith, a sensing cable having opposite ends, means securing one cable end to said platform at a point radially spaced from the axis of said shaft, means securing the other end of said cable to said frame means at a point radially spaced from the axis of the first-mentioned pivotal mounting, means for mounting said cable to extend along said boom and for causing said cable to move in response to movement of said boom, hydraulic motor means connected to said boom and to said shaft for selectively rotating said shaft in opposite directions, and servo valve means operatively connected to said cable and to said motor means and responsive to movement of said cable for selectively operating said motor means in directions to maintain said platform level for changing pivoted positions of said boom.

25. For an aerial tower, a platform-leveling mechanism comprising supporting frame means, an elongated boom having opposite ends, first means pivotally mounting said boom at one end on said frame means for pivotal movement about a horizontal axis, a platform, second means pivotally mounting said platform on the other end of said boom for pivotal movement about a horizontal axis, said second means including a substantially horizontal shaft secured to said platform for rotation therewith, a sensing cable having opposite ends, means securing one cable end to said platform at a point radially spaced from the axis of said shaft, means operatively securing the other end of said cable to said frame means at a point radially spaced from the axis of the first-mentioned pivotal mounting, said cable extending along said boom, means forming said cable into a loop and including means for changing the dimensions of said loop in relation to changes in pivoted position of said boom, motor means connected to said shaft for selectively rotating said shaft in opposite directions, and control means operatively connected to said cable loop and to said motor means and responsive to changes in dimensions of said loop for selectively operating said motor means in directions to maintain said platform level for changing pivoted positions of said boom.

26. For an aerial tower, a platform-leveling mechanism comprising supporting frame means, an elongated boom having opposite ends, first means pivotally mounting said boom at one end on said frame means for pivotal movement about a horizontal axis, a platform, second means pivotally mounting said platform on the other end of said boom for pivotal movement about a horizontal axis, said second means including a substantially horizontal shaft means secured to said platform for rotation therewith, a sensing cable having opposite ends, means securing one cable end to said platform at a point radially spaced from the axis of said shaft means, means operatively securing the other end of said cable to said frame means at a point radially spaced from the axis of the first-mentioned pivotal mounting, said cable extending along said boom, motor means connected to said shaft for selectively rotating said shaft means in opposite directions, and control means operatively connected to said cable and to said motor means and responsive to changes in movement of said cable for selectively operating said motor means in directions to maintain said platform level for changing pivoted positions of said boom.

27. For an aerial tower, a platform-leveling mechanism comprising supporting frame means, an elongated boom having opposite ends, first means pivotally mounting said boom at one end of said frame means for pivotal movement about a horizontal axis, a platform, second means pivotally mounting said platform on the other end of said boom for pivotal movement about a horizontal axis, the pivotal mounting of said second means permitting pivotal movement of said platform without movement of said boom, motor means connected between said platform and said boom for selectively pivoting said platform in opposite directions about the last-named horizontal axis, control means connected to said motor means for selectively operating the same in opposite directions, and actuating means connected to said platform and responsive to pivotal movement of the boom for operating said control means in selective directions for maintaining said platform level during changing of the pivoted position of said boom.

References Cited by the Examiner

UNITED STATES PATENTS

| | | | |
|---|---|---|---|
| 2,674,500 | 4/1954 | Hukari | 182—2 |
| 2,970,667 | 2/1961 | Bercaw | 182—2 |
| 3,127,952 | 4/1964 | Baerg | 182—2 |

HARRISON R. MOSELEY, *Primary Examiner.*

REINALDO P. MACHADO, *Examiner.*